March 16, 1954 — R. D. IRWIN — 2,672,285
INTEGRATING METER
Filed Nov. 3, 1949 — 2 Sheets-Sheet 1
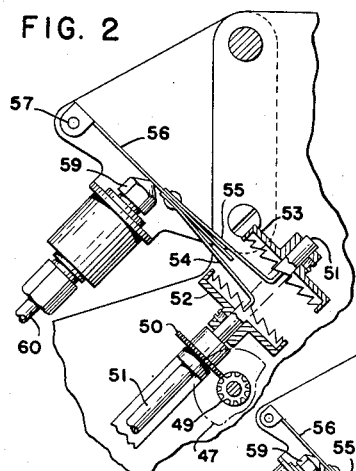
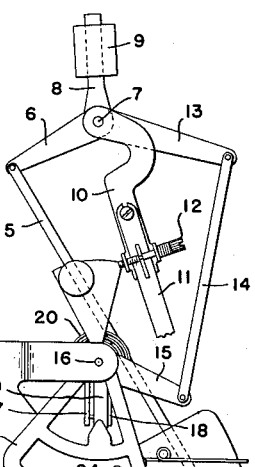
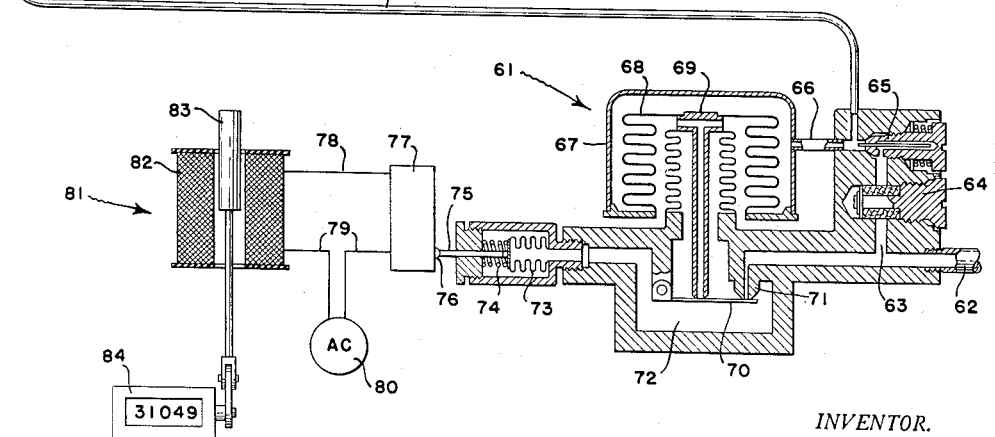
INVENTOR.
RUSSEL D. IRWIN
BY Arthur H. Swanson
ATTORNEY.

March 16, 1954

R. D. IRWIN 2,672,285

INTEGRATING METER

Filed Nov. 3, 1949

*INVENTOR.*
RUSSEL D. IRWIN

BY Arthur H. Swanson

ATTORNEY.

Patented Mar. 16, 1954

2,672,285

UNITED STATES PATENT OFFICE 2,672,285

INTEGRATING METER

Russel D. Irwin, Oreland, Pa., assignor to Minneapolis-Honeywell Regulator Company, Minneapolis, Minn., a corporation of Delaware Application November 3, 1949, Serial No. 125,240

4 Claims. (Cl. 235—61)

The object of the present invention is to provide an integrating meter which has the following advantages:

1. The meter imposes a minimum load on the measuring element,
2. The integrated value of the measured variable may be transmitted to a place remote from the meter.

In general the objects of the present invention are to provide a sensitive recording meter having simple, compact and effective provisions for periodically actuating an indicator either in the meter or remote from it, said actuations being in accordance with the values of the variables measured and being recorded at the times at which variations in the measured variable occur.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a simplified, vertical elevation with parts omitted and parts shown in vertical cross section for the sake of clarity.

Fig. 2 is a vertical elevation on an enlarged scale of parts of the device shown in Fig. 1 with the supporting plate removed and with parts broken away in transverse cross section.

Figure 3:
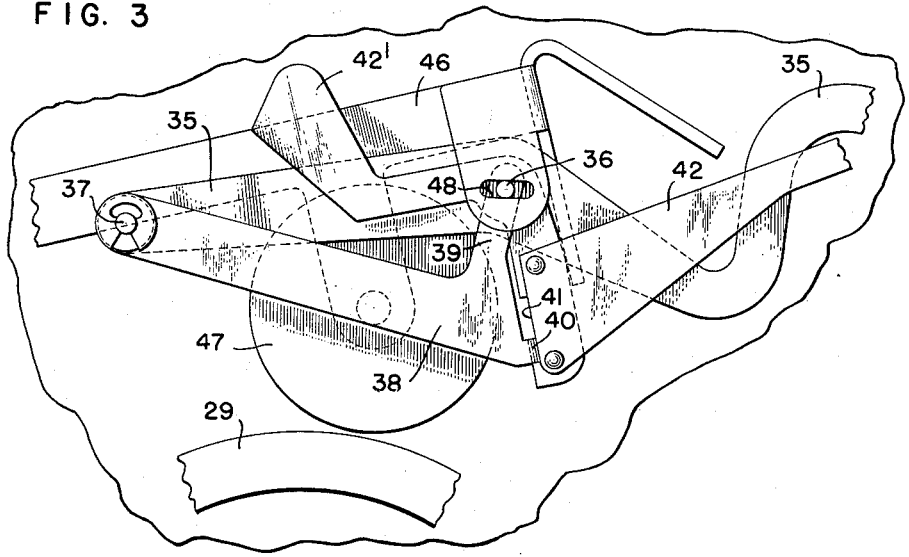
Fig. 3 is a vertical elevation on an enlarged scale of other parts of the device shown in Fig. 1.
Figure 4:
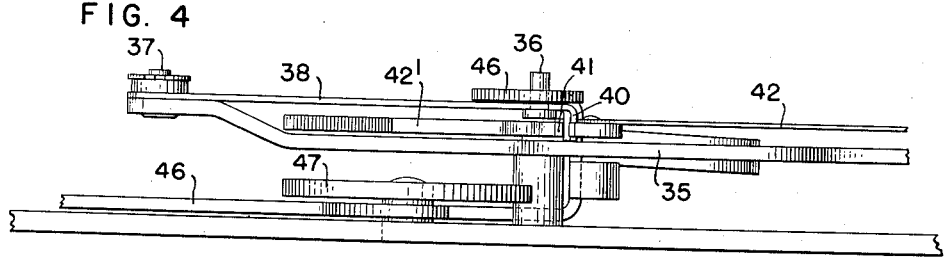
Fig. 4 is a view from the bottom of Fig. 3.

The meter of the present invention represents an improvement over the mechanical integrating meter shown in U. S. Patents 1,743,853; 1,743,854; 1,856,039; and 2,121,082 all to Thomas R. Harrison.

The integrating meter of the present invention is adapted to be actuated by any one of a number of measuring instruments, for example, a manometer, measuring flow. The measuring instrument is connected so as to rotate shaft 1 which carries an arm 2 to which is connected an adjusting slider 3 by means of a micrometer adjustment 4. A link 5 is held in one end in adjusted position on slider 3 and, at its opposite end, is connected to one arm 6 of a four-armed lever which is pivoted at 7. Arm 8 of the four-armed lever carries a counterweight 9 while arm 10 has a pen 11 attachably secured to it by means of a pen adjustment 12. The fourth arm 13 of the lever is connected to a second link 14 pivoted to arm 15 which is secured to a pivotally mounted shaft 16. Shaft 16 has loosely pivoted on it a pair of fingers 17 and 18. These fingers are stressed toward engagement with a centrally located arm 19 by means of a spring 20. Arm 19 forms part of a locking sector 21 which is pivotally mounted on shaft 16 and which has a perforation 22 through it.

On pivot 23 is rotatably mounted a brake 24 which is formed by a horizontally, forwardly projecting portion of a lever 25 having an arm 26 which is stressed by a spring 27 and a cam face 28 which is located behind driving disc 29 so that cam face 28 is intermittently engaged by brake-lifting pin 30 mounted on and projecting from the rear of disc 29.

A synchronous electric motor, generally indicated at 31, may conveniently be energized by the ordinary household 110–120 volt 60 cycle alternating current so that motor 31 rotates at 60 R. P. M. Motor 31 by any convenient gearing (not shown) drives chart hub 32 upon which a chart disc is mounted to receive markings from the pen 11.

Motor 31 by the same or other suitable gearing (not shown) rotates integrating driving disc 29 at a suitable speed such as 1 R. P. M. Disc 29 has attached to it an arm 33 to which is pivotally secured a link 34 pivoted at its opposite end to lever 35. Lever 35 is mounted so that it can rock about the axis represented by pin 36, hereinafter mentioned. The opposite end of lever 35 is pivoted at 37 to an L-shaped lever 38. As best seen in Fig. 3, L-shaped lever 38 has an arm 39 on which pin 36 is mounted and a horizontally extending, rearwardly bent end 40. End 40 is adapted to abut against face 41 of a tripper arm 42 which is also pivoted about the same axis as pin 36 and which is provided with a counterweight 42'. Tripper arm 42 has its outer end 43 horizontally extending and rearwardly bent so as to overlie the face of tripper blade 44 which is secured to and forms part of locking sector 21.

Pivoted on pin 45 immediately above motor 31 is a supporting lever 46 which carries an integrator roller 47 rotatably mounted on it. Lever 46 has a downwardly depending ear containing a slot 48 through which pin 36 projects. Integrator roller 47 is in the same plane as integrating disc 29 so that disc 29 rotates roller 47 when the two are in engagement. On its rear face, as shown in Fig. 2 roller 47 carries a worm gear 49 which meshes with a worm wheel 50 secured to and causing rotation of shaft 51. Shaft 51 carries on it a pair of crowned gears 52 and 53. The teeth of gears 52 and 53 are triangular and reversely directed. Feathers 54 and 55 cooperate with the teeth of gears 52 and 53, respectively. Feathers 54 and 55 have sufficient flexibility to allow shaft 51 to rotate. Secured to feathers 54 and 55 is a flapper 56 pivoted at 57 and biased by feather 55 into engagement with nozzle 59 which forms one end of a pipe or conduit 60.

The opposite end of conduit 60 forms part of an air-operated pilot valve or relay generally indicated at 61. Air enters pilot valve or relay 61 through supply pipe 62 which has a branch 63 passing a filter 64 to a restriction 65 which reduces the pressure of the supply or inlet air which passes to conduit or pipe 60 and through pipe 66 to the interior of bellows housing 67. Forming the other wall of the interior cavity of bellows housing 67 is an outer bellows 68 attached at its center to a perforated T-shaped exhaust pipe 69 the lower end of which engages a flapper 70 which also engages the nozzle 71 to which inlet air is directly fed from supply pipe 62. Pilot valve or relay 61 has a chamber 72 from which the controlled air is fed to a bellows 73 which is stressed by a spring 74 and against which one end of a pin 75 bears. The outer end of pin 75 engages the operating knob 76 of an electric switch 77. Switch 77 is actuated with a snap or quick on-off motion in response to a small movement of its operating knob 76. Switch 77 is connected to wires 78 and 79 which form the opposite sides of an electric circuit containing a source of electricity 80 such as an alternating current.

Also connected to wires 78 and 79 is an integrating, counting train or revolution counter generally indicated at 81. Train or counter 81 has a coil 82 connected to wires 78 and 79 which reciprocates an armature 83 which has either pivoted or ratchet connection with the counter mechanism 84.

The operation of the integrating meter of the invention is as follows: Changes of the variable measured by measuring element attached to shaft 1 causes shaft 1 to rotate and thereby causes arm 2, slider 3, link 5, lever arms 6 and 13, link 14 and arm 15 to rotate locking sector 21 about its pivot 16 and thus adjust the position of tripper blade 44. This adjustment takes place when brake 24 is lifted from the inner surface of perforation 22 by the engagement of brake lifting pin 30 with cam face 28 of lever 25.

Motor 31 continuously rotates integrating driving disc 29 and thereby causes arm 33, link 34, lever 35, and L-shaped lever 38, to oscillate tripper arm 42 about its pivot in alignment with pin 36. During a greater or lesser portion of its clockwise stroke tripper arm 42 moves so that its outer, rearwardly extending end 43 engages with the upper face of tripper blade 44. The lever 38 and the tripper arm 42 thus move to and fro over a path which includes any position to which the tripper blade 44 can be adjusted. Tripper arm 42 acts normally as a latch to hold integrator roller 47 out of engagement with the aligned driving disc 29. The position which tripper blade 44 is in when this engagement takes place is determined by the value of the measured variable as transmitted from the measuring element through shaft 1 and linkage above described.

When tripper arm 42 engages tripper blade 44, tripper arm 42 remains stationary while the L-shaped lever 38 continues to rotate. This frees end 40 of L-shaped arm 38 from face 41 of tripper arm 42. This causes pin 36 to rotate lever 46 about its pivot 45 so that integrator roller 47 engages with the rim of the constantly rotating integrating driving disc 29 so that roller 47 is rotated. Roller 47 is rotated only when it engages the surface of disc 29. At all other times roller 47 is at rest. Rotation of roller 47 causes worm 49 to turn worm wheel 50, shaft 51 and crown gears 52 and 53 secured to shaft 51. Rotation of shaft 51 causes the teeth of gears 52 and 53 to move flapper 56 relative to nozzle 59 with a number of pulses depending upon the number of teeth of gears 52 and 53 which engage feathers 54 and 55. This movement of flapper 56 relative to nozzle 59 causes a number of pulses of air pressure to be transmitted through conduit or pipe 60 to the air-operated motor formed by bellows casing 67, and outer bellows 68. These pulses cause pilot valve or relay 61 to transmit a corresponding number of pulses to bellows 73 which, by means of pin 75, causes a corresponding number of openings and closings of switch 77, thereby actuating the counter train or mechanism 81 a corresponding number of times. The number of actuations of counter train or mechanism 81 is shown by indicator 84.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In an integrating meter, a shaft having angular movements in response to changes in value of a variable metered, an exhibiting arm connected to and moving with said shaft, a tripper blade pivotally mounted, a helical spring mounted on said shaft for normally effecting simultaneous corresponding movements of said exhibiting arm and said tripper blade, radial fingers pivotally mounted on said shaft and connected to opposite ends of said spring, said fingers being arranged to hold said exhibiting arm and said tripper blade in a fixed relative position, a brake periodically restraining said tripper blade against movement, a tripper arm, a motor driving said tripper arm with regularly recurring synchronous cyclic movements, said tripper arm adapted to engage with said tripper blade at a stage in said cyclic movement of said tripper arm depending upon the instantaneous value of the variable metered, an air-controlling valve operated when said tripper arm and said tripper blade engage a number of times proportional to the instantaneous value of the variable metered, and an air-operated transmitter and receiver controlled by said valve and adapted to actuate an electric switch.

2. Mechanical apparatus for integrating a variable with respect to time, including in combination, a member positioned responsive to the value of the variable, means actuated at a substantially uniform time rate, mechanical means for periodically accumulating time increments of individual value in response to the interaction between said time-rate-actuated means and said member, an air-controlling valve operated to open or shut position by said mechanical means, an air-operated motor connected under the control of said valve so as to be actuated thereby, an air-controlling relay operated by said motor, and an air-operated receiver operated by said relay so as to be moved from one extreme position to the other upon each actuation of said valve.

3. In an integrator: a constant-speed, normally operating, driving mechanism; a normally inoperative, driven, integrating mechanism; friction means interconnecting said mechanisms; means operating cyclically to connect and to release said friction means and to hold said friction means in connection for a portion of the total time cycle corresponding to the instantaneous value of the variable metered; recurrently operating means forming part of said integrating mechanism; an air-controlling valve recurrently actuated by said operating means a number of times depending upon the time said mechanisms are connected; an air-operated transmitter and receiver under the control of said valve; an electric switch under the control of said receiver; and a counter to exhibit the integrated value of the variable metered and actuated by said electric switch.

4. In an integrator, an element positioned according to the instantaneous value of the variable being measured, a second element moving at a substantially uniform time rate over a path including said first element, a third element mounted so that upon contact between said first and second elements said third element is moved into engagement with said and driven by said second element for a period of time depending on the position of said first element, a fourth element driven by said third element for the period of time said third element is driven, said fourth element having an output consisting normally of a plurality of variations during each period of time said third element is driven, an air-controlling valve operated from open or shut position to the other of said positions by said fourth element at the output frequency of said fourth element, an air-operated receiver connected so as to be moved from one extreme position to the other upon each actuation of said valve, an electric switch operated by said receiver so as to be moved from open or closed position to the other of said positions upon each actuation of said receiver, and an electrically operated counter connected in circuit with said electric switch so as to be controlled thereby.

RUSSEL D. IRWIN.

References Cited in the file of this patent

UNITED STATES PATENTS

| Number | Name | Date |
|---|---|---|
| 820,197 | Hucks, Jr. | May 8, 1906 |
| 1,476,183 | Roucka | Dec. 4, 1923 |
| 1,700,365 | Broadmeyer | Jan. 29, 1929 |
| 1,743,853 | Harrison | Jan. 14, 1930 |
| 1,953,328 | Wooley | Apr. 3, 1934 |
| 1,977,498 | Staegemann | Oct. 16, 1934 |
| 1,993,707 | Rosecrans | Mar. 5, 1935 |
| 2,022,275 | Davis | Nov. 26, 1935 |
| 2,207,908 | Beecher | July 16, 1940 |
| 2,266,839 | Ackley | Dec. 23, 1941 |
| 2,540,193 | Eckman | Feb. 6, 1951 |

FOREIGN PATENTS

| Number | Country | Date |
|---|---|---|
| 101,297 | Great Britain | Aug. 27, 1917 |